(12) United States Patent
De Brabandere et al.

(10) Patent No.: US 9,106,152 B2
(45) Date of Patent: Aug. 11, 2015

(54) METHOD FOR STABILIZING AN ELECTRIC GRID

(71) Applicant: SMA Solar Technology AG, Niestetal (DE)

(72) Inventors: Karel De Brabandere, Turnhout (BE); Vitali Sakschewski, Fuldabrueck (DE); Lars Cramer, Kassel (DE); Yehia Tarek Fawzy, Kassel (DE); Stijn Stevens, Benterode (DE); Daniel Premm, Kaufungen (DE)

(73) Assignee: SMA Solar Technology AG, Niestetal (DE)

( * ) Notice: Subject to any disclaimer, the term of this patent is extended or adjusted under 35 U.S.C. 154(b) by 150 days.

(21) Appl. No.: 13/772,660

(22) Filed: Feb. 21, 2013

(65) Prior Publication Data
US 2013/0182477 A1 Jul. 18, 2013

Related U.S. Application Data

(63) Continuation of application No. PCT/EP2011/065230, filed on Sep. 2, 2011.

(30) Foreign Application Priority Data

Sep. 6, 2010 (DE) .......................... 10 2010 037340

(51) Int. Cl.
*H02M 7/537* (2006.01)
*H02M 7/44* (2006.01)
*H02J 3/38* (2006.01)

(52) U.S. Cl.
CPC ................. *H02M 7/44* (2013.01); *H02J 3/383* (2013.01); *Y02E 10/563* (2013.01)

(58) Field of Classification Search
USPC ........................ 363/95–99, 123, 131; 323/207
See application file for complete search history.

(56) References Cited

U.S. PATENT DOCUMENTS

| | | | | |
|---|---|---|---|---|
| 5,880,948 A | * | 3/1999 | Nachbauer | 363/95 |
| 5,883,796 A | * | 3/1999 | Cheng et al. | 363/40 |
| 2009/0059631 A1 | * | 3/2009 | Krein | 363/95 |

(Continued)

OTHER PUBLICATIONS

International Search Report and Written Opinion of the International Searching Authority dated May 29, 2012 for International Application No. PCT/EP2011/065230. 15 Pages.

(Continued)

*Primary Examiner* — Adolf Berhane
*Assistant Examiner* — Henry Lee, III
(74) *Attorney, Agent, or Firm* — Eschweiler & Associates, LLC

(57) ABSTRACT

A method for grid support by means of an inverter is disclosed, wherein the grid is supported by feeding in compensation currents. The method includes measuring a prevailing grid state, and breaking down voltages measured for measuring the prevailing grid state into symmetrical components of the grid state including positive sequence system components and negative sequence system components. The method further includes determining symmetrical components of a compensation current including positive sequence system components and negative sequence system components of the compensation current as functions of deviations of the positive sequence system components and negative sequence system components of the grid state from reference values, and feeding-in a compensation current as the vector sum of the determined symmetrical components of the compensation current.

22 Claims, 6 Drawing Sheets

(56) References Cited

U.S. PATENT DOCUMENTS

| | | | |
|---|---|---|---|
| 2010/0052322 A1* | 3/2010 | Fortmann et al. | 290/44 |
| 2010/0052429 A1* | 3/2010 | Nethery, III | 307/85 |
| 2011/0057444 A1* | 3/2011 | Dai et al. | 290/44 |
| 2011/0317460 A1* | 12/2011 | Garcés Rivera et al. | 363/127 |

OTHER PUBLICATIONS

J. Eloy-Garcia, et al.; "Direct Power Control of Voltage Source Inverters with Unbalanced Grid Voltages", IET Power Electronics, Jan. 26, 2007, vol. 1, No. 3, pp. 395-407.

Song Xian-wen, et al.; "Dual Reference Frame Scheme for Distributed Generation Grid-Connected Inverter Under Unbalanced Grid Voltage Conditions", IEEE 2008, School of Electrical Engineering, Xi'an, China, p. 4552-4555.

A. Luna, et al.; "Control Strategies for DFIG Wind Turbines Under Grid Fault Conditions", IEEE 2009, p. 3886-3891.

Pedro Rodriguez, et al.; "Reactive Power Control for Improving Wind Turbine System Behavior Under Grid Faults"; IEEE Transactions on Power Electronics, vol. 24, No. 7, Jul. 2009, p. 1798-1801.

Ionel Vechiu, et al.; "Transient Operation of a Four-Leg Inverter for Autonomous Applications with Unbalanced Load", IEEE Transactions on Power Electronics, vol. 25, No. 2, Feb. 2010, p. 399-407.

* cited by examiner

METHOD FOR STABILIZING AN ELECTRIC GRID

REFERENCE TO RELATED APPLICATIONS

The present application is a continuation of PCT/EP2011/065230, filed Sep. 2, 2011, which claims priority to German patent application no. 10 2010 037 340.0, filed Sep. 6, 2010, the contents of which are hereby incorporated by reference in their entirety.

FIELD

The disclosure relates to a method for stabilizing an electric supply grid, for example a public electric grid for supplying consumers with electrical energy.

BACKGROUND

A "stability of an electric grid" is understood to mean a state in which certain values that characterize the voltages provided by the grid (for example a voltage level, a phase relationship and/or a frequency) are within a range which is defined—possibly by a grid or system operator.

This "stability of an electric grid" defined in the above paragraph can be adversely affected by deviations from a defined desired state, also referred to as an optimum state, wherein the desired state can be described by defined setpoints, e.g. for the above-mentioned characterizing values. Grid faults also constitute such deviations, as they cause a grid state in which one or more of the values designated above deviate from the setpoints.

The grids in question for supplying consumers with electrical energy usually have different grid levels (also referred to as supply levels): A low-voltage level (LV), a medium-voltage level (MV) and a high-voltage level (HV). Expressed simply, these are individual grids with different voltage ranges that are coupled by means of transformer devices.

Grid faults—and deviations from the optimum state in general—can occur at any grid or supply level. To differentiate between individual types of deviation or grid faults, these can be divided into different classes, in particular to differentiate between symmetrical (for example a three-phase voltage dip in a three-phase system) and asymmetrical deviations or faults (for example a single-phase voltage dip or short circuit in a polyphase system, a polyphase short circuit to ground (PE potential) or a short circuit between individual phases).

Grid regulations exist in numerous countries for different grid levels. Requirements for power generation systems (for example for inverters) are defined in these grid regulations, for example, requirements that specify a certain behavior of a power generation system when a certain grid fault occurs, in particular with the objective of supporting the grid.

In the event of a deviation from the optimum state and, in particular, in the event of a grid fault, the decentral power generators can remain connected to the grid and contribute to supporting or stabilizing the grid by purposefully feeding-in active and reactive power. When, in the case of a severe voltage dip, the supporting infeed only takes place for a short time and very dynamically (e.g. in the millisecond range), this is also referred to as "Dynamic Grid Support" (DGS) or "Fault Ride Through" (FRT). The specific embodiments of these requirements in different countries or regions or defined by different grid operators sometimes differ considerably from one another and sometimes even contradict one another. One reason for this is different opinions regarding the nature of an optimum grid support.

One point of agreement between a number of grid regulations is to define a fault event that is to be supported by the generation system as short (considerably shorter than one second). A long-term asymmetry, for example due to a relatively high load on a single phase of a polyphase system, is allowed within certain limits and is not looked upon as being a fault, particularly at the low-voltage level (LV). However, such a case also constitutes a deviation from the optimum state that can escalate into a fault if the values that characterize the grid deviate too greatly from the setpoints. A stabilization of the grid with respect to such deviations is therefore also desirable and is referred to as "static grid support".

A further point of agreement between a number of grid regulations is that droop functions that define compensation currents to be supplied as a function of the deviations of the prevailing grid voltages from reference values are specified. These so-called reactive current droop characteristics sometimes include dead bands within which no infeed of compensation currents is necessary.

In order to analyze a grid state, the voltages of the individual phases are measured (i.e. the relevant values that describe the voltage—voltage value, phase relationship and possibly frequency—are measured) and transformed into symmetrical components using mathematical methods that are known to the person skilled in the art (for example by means of known matrix operations).

As a result of this mathematical calculation, information relating to a so-called "positive sequence system", a so-called "negative sequence system" and possibly a so-called "zero sequence system" is obtained. These terms and examples of their calculation using a Fortescue matrix are described in more detail for example in relevant textbooks (e.g. see Heuck et. al. "Elektrische Energieversorgung", Vieweg Verlag, 7th edition 2007, Chapter 9 & 10) and are known to the person skilled in the art.

If a grid is in a fault-free state and if no asymmetrical loads are present, then the calculations yield no negative sequence system. A purely symmetrical fault only effects a change in the amplitudes of the positive sequence system. On the other hand, an asymmetrical fault and/or an asymmetrical load distribution gives rise to the occurrence of negative sequence system components. Fundamentally, a zero sequence system does not exist in a three wire grid. These basic principles are also known to the person skilled in the art.

Devices and methods for grid support or grid stabilization are also known per se. Classical "grid supporters" are implemented in the form of synchronous machines (SM). Due to their design, synchronous machines generate compensation currents whenever a negative sequence system exists and are therefore able to support or stabilize the grid in that, in the event of grid voltage changes—e.g. caused by grid faults—they generate compensation currents, which oppose the change and therefore damp the grid fault.

A method for wind turbines (WT), which feeds in asymmetrical compensation currents in the event of a grid fault, is disclosed in DE 10 2007 005 165 A1. Along with grid support, the main objective here is to "moderate" the effects of the grid fault on the operation of the WT, thus enabling it to continue operation and not have to be disconnected from the grid. The proposed method essentially comprises tracking a positive sequence system component and a negative sequence system component of the grid state, aligning the negative sequence system component to compensate for asymmetries (asymmetrical grid fault), and feeding-in of compensation currents.

As well as system protection, this method is designed to support the medium-voltage level, wherein the WT is not usually incorporated in a low-voltage grid for supplying electrical consumers and therefore the presence of at least one transformer between the location of a fault and a generator is assumed. A permissible long-term asymmetry as described above (for example a relatively high load on a single phase of a polyphase system) generates a quasistatic negative sequence system at the low-voltage level (LV). The method proposed in DE 10 2007 005 165 A1 cannot be used optimally at the low-voltage level (LV), as in all cases compensation currents are fed in when a negative sequence system is present. On the one hand, these currents are not necessary with imbalances of the voltage amplitudes of the individual phases at the low-voltage level that are permissible per se and, under certain circumstances, can even amplify an asymmetry in a low-voltage supply grid. Furthermore, this method is not able to support symmetrical grid faults due to the exclusive alignment towards the negative sequence system components.

A method for regulating the negative sequence system of a wind turbine (WT), which normally minimizes the active component in the negative sequence system and maximizes its reactive component, is disclosed in DE 10 2006 054 870 A1. A grid fault detector is also provided. In the event of a grid fault, different regulation objectives are pursued with the help of a priority module, i.e. either the active power is maximized ("system protection") or the active and reactive components of the positive sequence and negative sequence system are optimized in order to support the grid. In doing so, the optimization objective is determined by means of previously defined setpoints of an active or reactive power to be fed in.

SUMMARY

Against the background of the above comments, the disclosure includes a method for supporting the grid that can be applied at a low-voltage level and/or at a medium-voltage level and can be used both flexibly and configurably, taking into account grid regulations if necessary.

In one embodiment the method comprises measuring of a prevailing grid state, and breaking down of the measured grid voltages into symmetrical components of the grid state including positive sequence system components and negative sequence system components. The method further comprises determining symmetrical components of a compensation current including positive sequence system components and negative sequence system components of the compensation current as functions of the deviations of the positive sequence system components and the negative sequence system components of the grid state from reference values, and feeding-in a compensation current as the vector sum of the symmetrical components of the compensation current thus determined.

The method according to the disclosure has a range of advantages compared with the known methods:

On the one hand, the method according to the disclosure enables a large number of decentral power generators (for example photovoltaic systems with infeeding inverters) to be integrated into the existing structure of the electrical energy supply (i.e. to be integrated into the existing grid structure, in particular directly into the existing low-voltage level), as it enables the decentral power generators to carry out and undertake a regulation-compliant grid-supporting or grid-stabilizing function.

On the other hand, by means of the method according to the disclosure, it is possible to make use of the technical potential of inverters for dynamic and/or static grid support, particularly in the case of asymmetrical grid states or grid events such as grid faults for example, wherein different grid regulations can also be taken into account.

In the event of deviations from the optimum state at one of the supply levels, the grid can be supported by a specific feeding-in of compensation currents at the low-voltage level.

Furthermore, the method according to the disclosure takes into account future grid regulations, as, on the one hand, it works to a substantial extent adaptively (self-matching), while, on the other hand, setpoints and other parameters specified by the regulations can be taken into account in a suitable form in the method. For this purpose, appropriate parameters in the method are designed to be adaptable and, in particular, the grid characteristics that are different for different voltage levels, such as the grid impedance, which can differ even at different connecting points within a grid voltage level, are also taken into account.

In an advantageous embodiment of the method, at least one of the reference values is specified as a setpoint that describes an optimum state of the grid state. Particularly advantageously, the setpoint is dependent on grid characteristics, in particular on a grid impedance.

In a further advantageous embodiment of the method, at least one of the reference values is determined as the average value of the respective symmetrical component of the grid state. In doing so, at least one of the average values can be formed in a particularly robust manner by means of low-pass filters. In this variant, the method is particularly stable and, in particular, is not influenced by any asymmetries of the grid state that are permissible per se.

In a further advantageous embodiment of the method, zero sequence system components of the compensation current are determined as functions of the deviations of the zero sequence system components of the grid state from reference values.

Advantageously, the determination of the symmetrical components of the compensation current is based on real and/or imaginary parts of the positive sequence system and negative sequence system and, if appropriate, of the zero sequence system of the grid state.

Taking into account the real parts of the positive sequence, negative sequence and, if appropriate, zero sequence system components of the compensation current results in a compensation current with reactive current components that lag the voltage. In particular, this is suitable for supporting grids with predominantly inductive impedance, such as medium-voltage grids for example. Also taking into account the imaginary parts of the positive sequence, negative sequence and, if appropriate, zero sequence system components of the compensation current results in a compensation current that is not restricted to reactive current components that lag the voltage. This not only enables grids with predominantly inductive impedance to be supported, but also such grids that have inductive and resistive impedance components in any ratio. In particular, this also includes grids with predominantly resistive impedance, such as low-voltage grids, for example.

The functions used for determining the symmetrical components of the compensation current are, in one embodiment, droop functions, for which at least the parameters "slope" and "dead band" are provided to enable them to be described particularly efficiently. In one embodiment, the droop functions are dependent on the grid characteristics, in particular on the grid impedance. At the same time, the grid characteristics, in particular the grid impedance, are determined by the inverter in one embodiment.

BRIEF DESCRIPTION OF THE DRAWINGS

The disclosure is described in more detail below with reference to the attached drawings. In the drawings.

DETAILED DESCRIPTION

Figure 1:
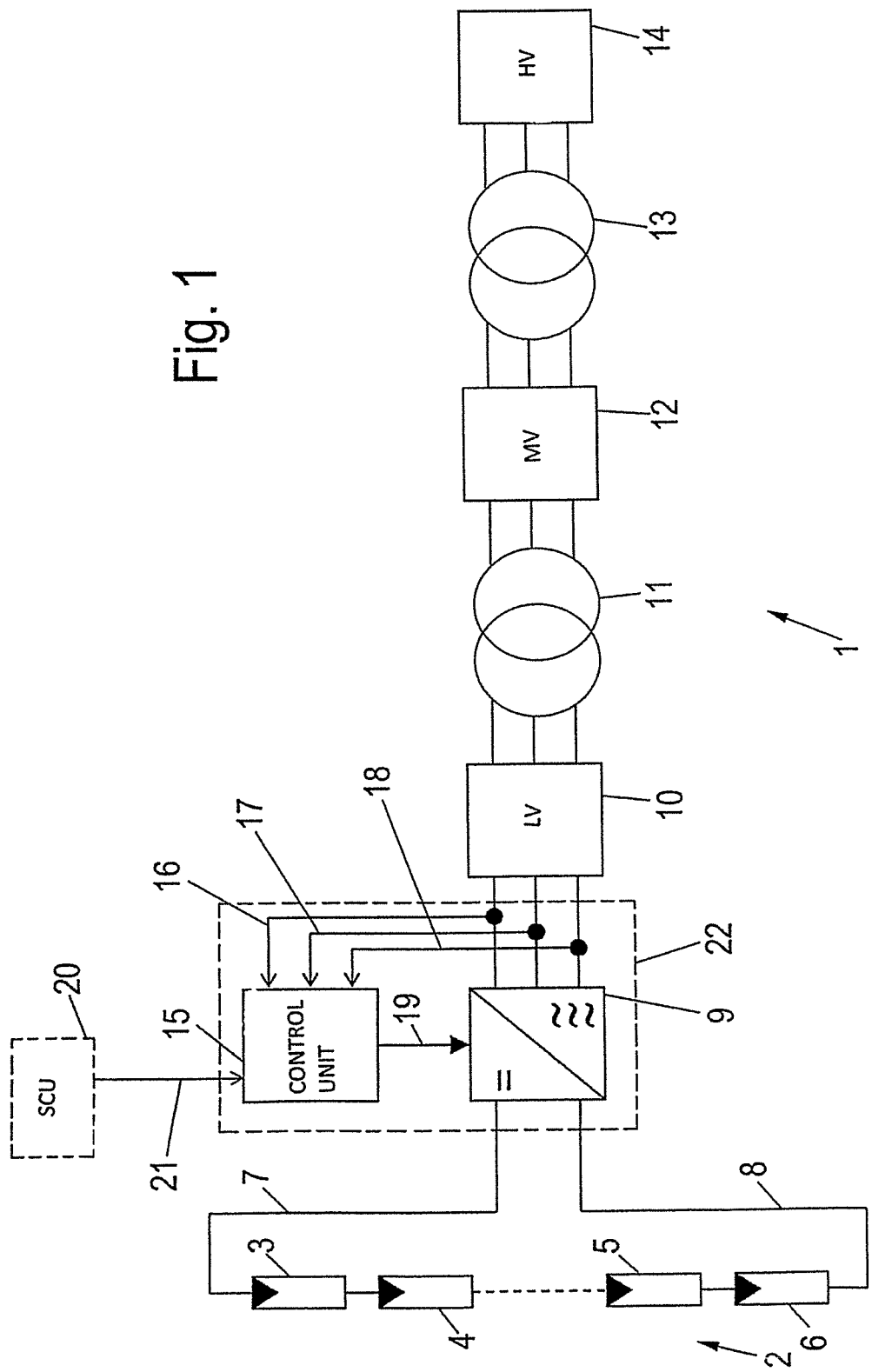
FIG. 1 shows by way of example a device for generating electrical energy that is connected to a grid in order to explain the method according to the disclosure.

FIG. 1 shows a device 1 for generating electrical energy.

A PV generator 2, which has a number of PV modules 3, 4, 5, 6 that are connected according to the prevailing requirements, is shown.

On the DC side, the PV generator 2 is connected by means of a positive DC cable 7 and a negative DC cable 8 to an inverter 9. The PV generator 2 converts radiated energy into a direct current that is, in turn, converted by the power stage 9 in the inverter 22 into one or more alternating currents that can be fed in.

On the AC side, the inverter 22 is connected by means of electrical cables to a low-voltage level (LV) 10 of an electric grid—for example the public electricity grid—for supplying consumers with electrical energy. For reasons of clarity, the individual cables on the AC side are not referenced. The diagram is of a three-phase electricity grid, the three phases of which are normally designated by L1, L2 and L3.

Within the framework of the above comments, the disclosure is explained by way of example based on a three-phase electric grid. These comments are, of course, not to be taken as restrictive.

The low-voltage level 10 is connected to a medium-voltage (MV) level 12 of the grid by means of a transformer 11. The medium-voltage level 12 is in turn connected to a high-voltage (HV) level 14 of the grid by means of a further transformer 13. The diagram of the grid, its levels 10, 12, 14 and the transformers 11 and 13 is highly simplified; the person skilled in the art is, however, familiar with a grid structure of this kind.

A control unit 15 is also shown. The control unit 15 is designed to carry out the method according to the disclosure. The control unit 15 is provided with the necessary time course of the voltages of the respective phases of the low-voltage level 10 of the grid via the voltage measuring cables 16, 17, 18. An arrow designated by the reference 19 symbolizes the controlling of the power stage 9 of the inverter by the control unit 15 in accordance with the method according to the disclosure.

The control unit 15 can also be designed as part of an inverter control system and, for example, be arranged in a housing of the inverter 9 (this is shown by the dashed line with the reference 22).

An inverter 9 shown can also be designed in such a way that it is designed as a combination of three (in a three-phase system) independent single-phase inverters without their own control for supporting the grid, that is to say, for example, having no FRT control of their own (not shown). The independent inverters of an arrangement of this kind would then be controlled by a superimposed control unit 15.

In a further embodiment, a system can have a multiplicity of PV generators 2 with single-phase or three-phase inverters 9 associated with each thereof. Such larger photovoltaic systems can also be connected directly via a transformer 11 to the medium-voltage level 12 so that, in such a case, the low-voltage level 10 is not present at least in the form of a supply grid. In this case, this number of inverters can be controlled by one or more control units 15.

In an embodiment of this kind, it is conceivable that the control units 15 undertake the control of the grid support of the inverters 9 directly and/or that a superimposed control unit (SCU) 20 carries out the necessary voltage measurements or is provided with the necessary voltage values by a further device (not shown), for example a grid operator's device—for example via a data connection designed for this purpose—and transmits the parameters required for the control of the grid support (symbolized by arrow 21) to the control unit(s) 15. Furthermore, it is conceivable that these parameters required for the control of the grid support can also be provided by further devices, for example, by a grid operator.

Figure 2:
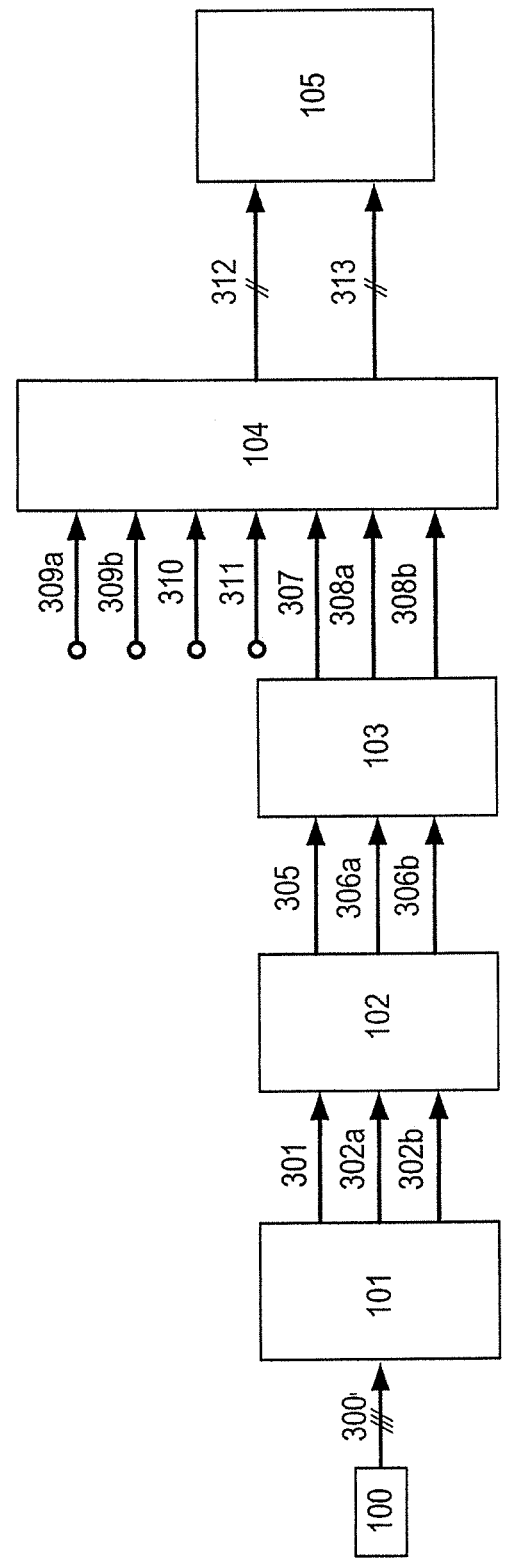
FIG. 2 shows a block circuit diagram in order to explain a method according to the disclosure in a first exemplary embodiment.
Figure 3:
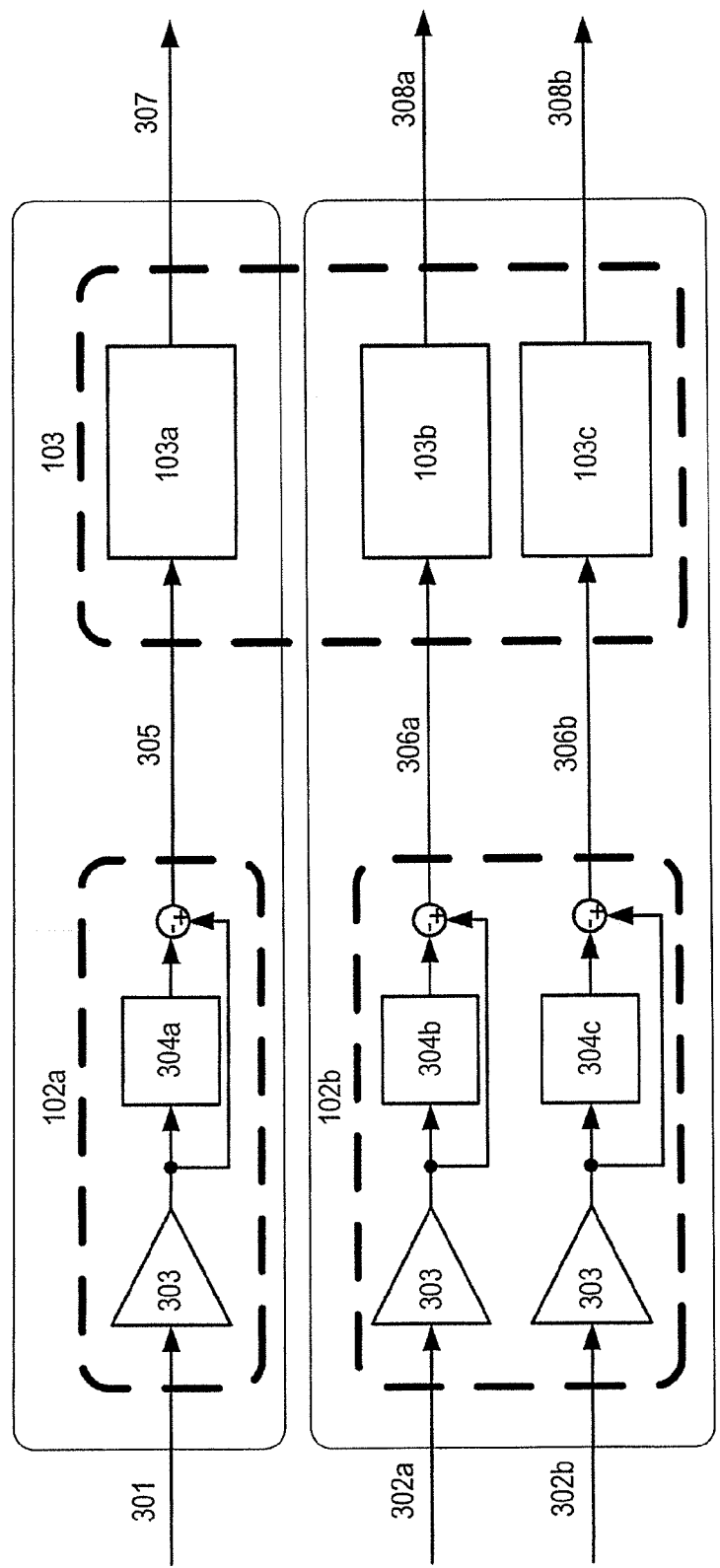
FIG. 3 shows a detailed diagram of the function blocks 102, 103 from the block circuit diagram shown in FIG. 2.

A first exemplary embodiment of a method for dynamic and/or static grid support, the method acts of which are shown in FIGS. 2 and 3 in the form of differently simplified flow diagrams in each case, is proposed below:

At 100, the prevailing grid state is measured via the voltage measuring cables 16, 17, 18 and the measured time course 300 of the voltages of the grid phases are output.

The time course 300 of the grid voltages measured at 100 for measuring the prevailing grid state are transformed into symmetrical positive sequence system components 301 and into symmetrical negative sequence system components 302a, 302b at 101.

With regard to the phase relationship, the positive sequence system constitutes the reference system for the control; in other words, it has a phase relationship of zero. In a vector diagram, the positive sequence system therefore has only a real part and no imaginary part. In a dq-diagram, the q-component is correspondingly equal to zero. The positive sequence system can consequently be described by a single (scalar) component 301. By definition, the negative sequence system can have a phase relationship compared with the positive sequence system that is other than zero. Real and imaginary parts or d-components and q-components are therefore necessary to represent it. The negative sequence system can consequently be specified by two (scalar) components 302a and 302b.

At 102 (cf. blocks 102a and 102b in FIG. 3), the symmetrical components 301, 302a, 302b determined at 101 are multiplied by an inverse value 303 of the agreed voltage at the grid connection point and the deviations 305, 306a, 306b of the thus normalized symmetrical components with respect to specified reference values 304a, 304b, 304c respectively are determined. In the example shown in FIG. 3, these reference values 304a, 304b, 304c are formed by means of an integrator (low-pass filter), shown as a rectangle in the figure, in the form of a moving average of the values of the normalized symmetrical components. The reference state is therefore obtained from the immediately previous grid state in the past, as a result of which only dynamic changes to the grid state are recognized as deviations. In this sense, the method shown in this first example embodiment is a method for dynamic grid support. Here, the average value is formed over a period of time that is (considerably) longer than a duration of a grid fault to be supported and that is specified by the grid operator by means of appropriate regulations (see above, "considerably shorter than one second"). Hence, for example, the period mentioned above for forming the reference values could be greater than one second if the specified duration of a grid fault to be supported is less than 150 milliseconds.

However, it is understood that the reference values 304a, 304b, 304c can also be provided in a fixed or variable form and fed to the blocks 102a, 102b from the outside and not determined from the previous grid state. This is realized, for example, in the second example embodiment in FIG. 5. In such a case, slow deviations, so-called drifts, can also be detected and compensated for. Such a method is then also referred to as a method for static grid support.

At 103, a number of symmetrical components 307, 308a, 308b of compensation currents are determined from the deviations 305, 306a, 306b determined at 101 taking into account specifiable droop functions. In the simplest case, the droop functions are given by a constant factor.

At 104, the symmetrical components 307, 308a, 308b of the compensation currents determined at 103 are converted into setpoints 312, 313 for the symmetrical components of the feed-in currents, if necessary, incorporating the prevailing PV generator current 309a, active current requirements 309b, static reactive current requirements 310 and static requirements for negative sequence system components 311.

Finally, at 105, the setpoints 312, 313 determined at 104 are transmitted in a suitable form via the activation signal 19 to the power stage 9 of an inverter 22 so that, according to the disclosure, the inverter feeds-in currents that, if necessary, are modified compared with normal operation into the low-voltage level 10 or directly into the transformer 11. Consequently, the system intervenes to support or stabilize the grid—by feeding in compensation currents—depending on the prevailing grid state and the reference values taking into account the specifiable droop functions.

Figure 4:
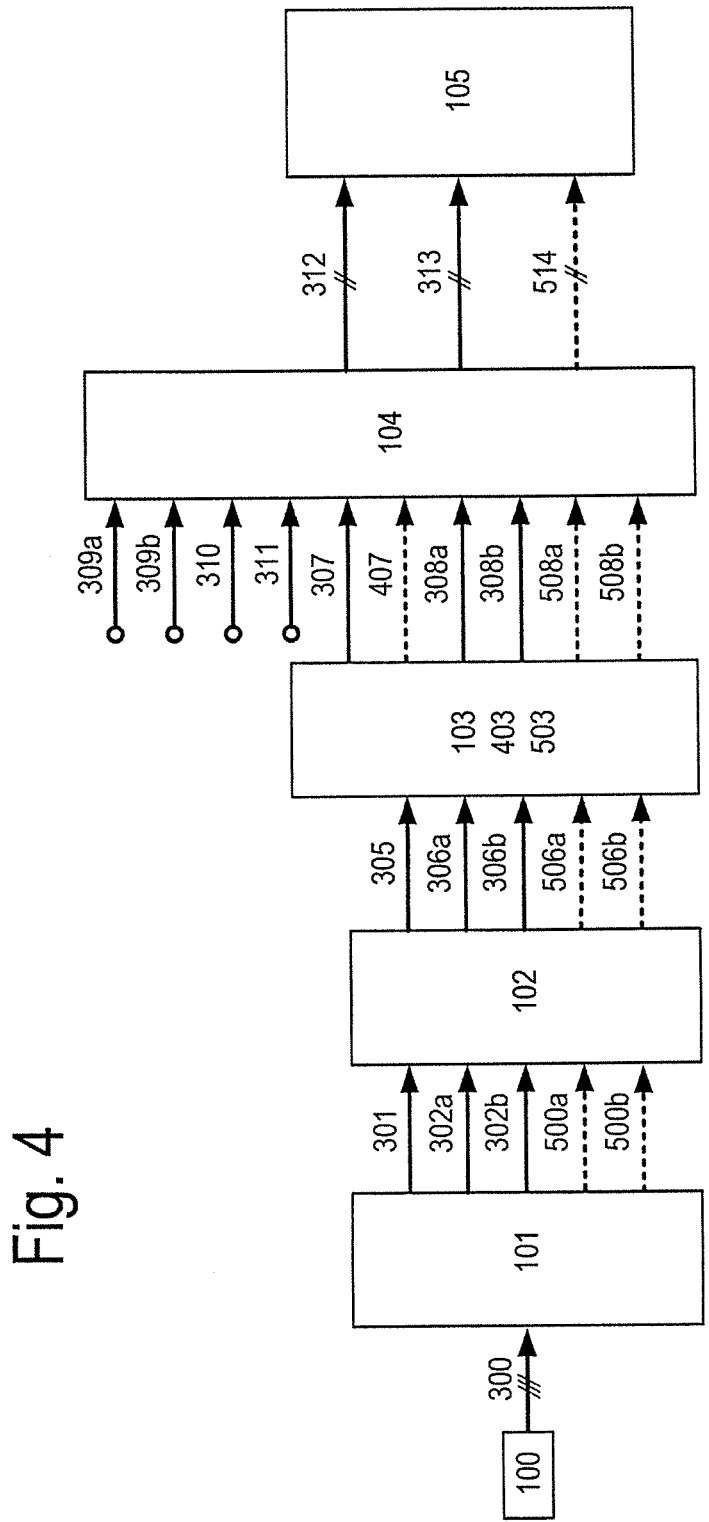
FIG. 4 shows a block circuit diagram in order to explain a method according to the disclosure in a second exemplary embodiment.

A method for grid support in a second example embodiment is described in more detail below in conjunction with FIGS. 4 to 6. Here, the same references identify steps that act identically or similarly to those in FIGS. 2 and 3.

As in the first example embodiment (cf. FIG. 2), here too (cf. FIG. 4) time courses 300 of the grid voltages of the prevailing grid state are measured at 100 and are transformed into symmetrical positive sequence system components 301 and into symmetrical negative sequence system components 302a, 302b at 101. Also, in this example embodiment, the zero sequence system is additionally taken into account in that a real part 500a and an imaginary part 500b of the zero sequence system components are determined.

In the first example embodiment (cf. FIG. 3), an imaginary part 307 of the negative sequence system component of the compensation current, which as a result is shifted in phase by 90° compared with the grid voltage, was then calculated from the real part 301 of the positive sequence system component of the grid voltage taking into account the droop function at 103a. In this way, as a result, a lagging compensation current is fed in at 105, as a result of which the method of the first example embodiment is particularly suitable for supporting grids having a grid impedance with a predominantly inductive component such as medium-voltage grids, for example.

Figure 5:
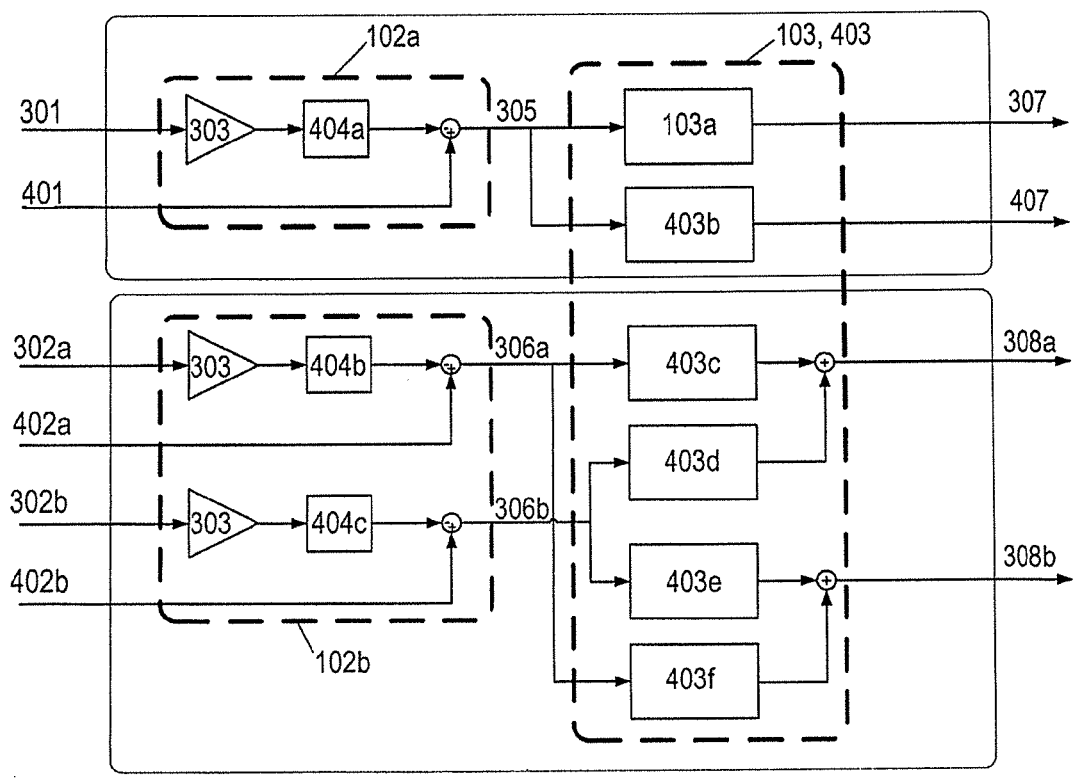
FIG. 5 shows a detailed diagram of a first part of the function blocks 102, 103, 403, 503 from the block circuit diagram shown in FIG. 4.

As FIG. 5 of the second example embodiment, which is analogous to FIG. 3, shows, the imaginary part 307 of the positive sequence system component of the compensation current is again calculated herein from the corresponding real part 301 of the positive sequence system component of the grid voltage and, in addition, a real part 407 of the positive sequence system component of the compensation current is calculated taking into account a further droop function in block 403b. Here, the desired target or reference values 401 (and 402a, 402b, 502a, 502b, see below) can be provided externally and are not obtained from the previous grid state as in the example embodiment of FIG. 3. In the example embodiment shown, the method is therefore particularly suitable for static grid support. Grids, the grid impedance of which unlike a medium-voltage grid does not predominantly have an inductive component, but is dominated by resistive components, such as low-voltage grids for example, can also be supported by the method in this embodiment. Nevertheless, low-pass filters 404a, 404b, 404c are provided for smoothing the positive sequence and negative sequence system components.

In a similar way, in order to determine the real part 308b and the imaginary part 308a of the negative sequence system component of the compensation current, the normalized deviation from the desired state in real part 306a and imaginary part 306b is now determined in each case from the corresponding real part 302a and imaginary part 302b of the negative sequence system components of the grid voltage in comparison with the reference values 402a, 402b (step 102b). At 403, the real part 308b and the imaginary part 308a of the negative sequence system component of the compensation current are then determined "crosswise" from the normalized deviations from the desired state 306a, 306b taking into account specifiable droop functions at 403c-403f.

Figure 6:
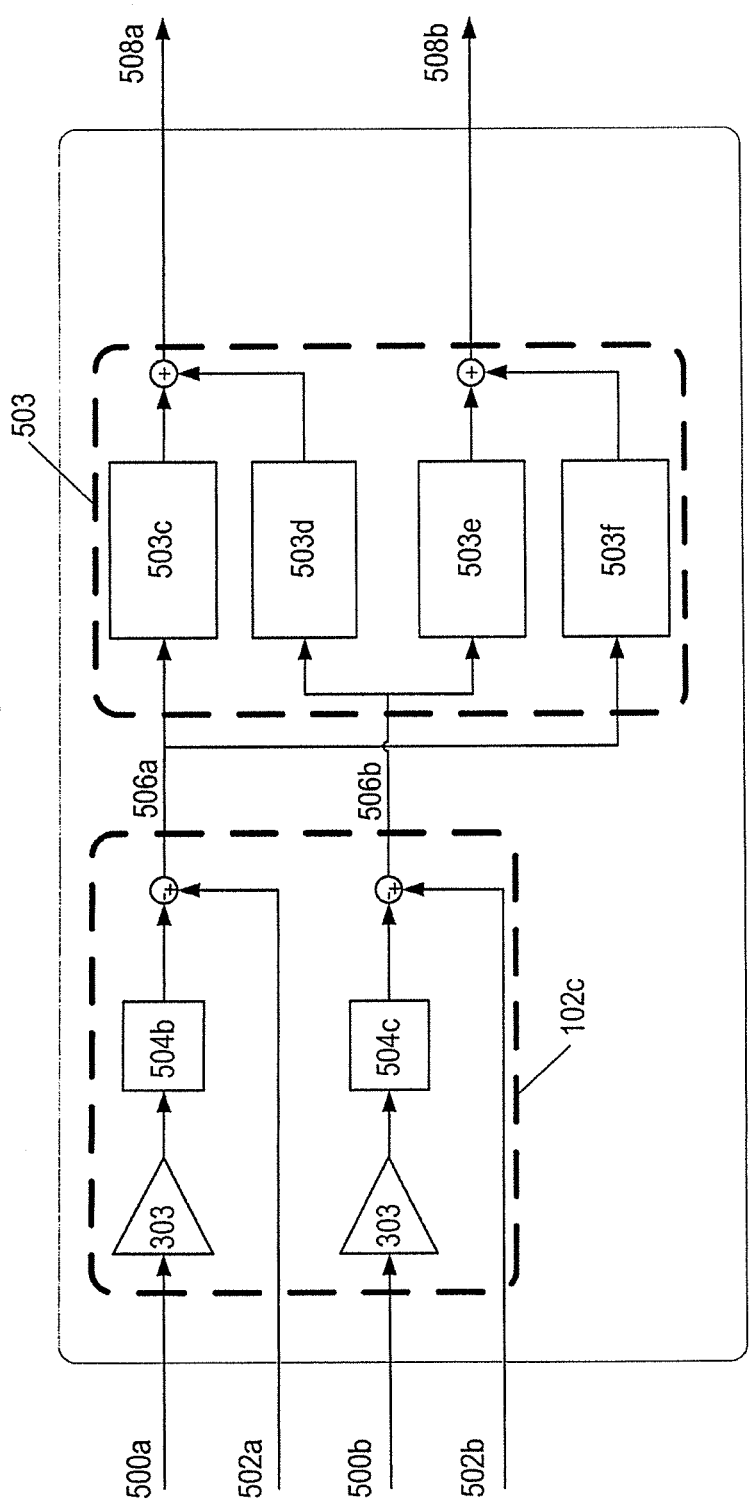
FIG. 6 shows a detailed diagram of a second part of the function blocks 102, 103, 403, 503 from the block circuit diagram shown in FIG. 4.

Furthermore, as an option, zero sequence system components 508a, 508b of the compensation current can be determined in the same way, as shown in FIG. 6. The normalized deviation from the desired state in the real part 506a and the imaginary part 506b is in each case first determined from the corresponding real part 500a and imaginary part 500b of the zero sequence system components of the grid voltage in comparison with the reference values 502a, 502b relating thereto (at 102c). The zero sequence system components 508a and 508b of the compensation current are then, in turn, determined "crosswise" from the normalized deviations from the desired state 506a, 506b taking into account specifiable droop functions at 503c-503f. This method is particularly suitable for static grid support when the grid is designed as a four-wire system (e.g. so-called TN-C networks), which is regularly the case at the low-voltage level.

Subsequently, at 104, as in the first example embodiment, the previously determined components are once again converted into setpoints 312, 313 and, if appropriate, 514 for the symmetrical components of the feed-in currents, if necessary incorporating the prevailing PV generator current 309a, active current requirements 309b, static reactive current requirements 310 and static requirements for negative sequence system components 311.

Finally, at 105, the setpoints 312, 313 and, if appropriate, 514 determined at 104 are transmitted in a suitable form via the control signal 19 to the power stage 9 of an inverter 22 so that, according to the disclosure, this feeds currents, which if necessary are modified compared with normal operation, into the low-voltage level 10 or directly into the transformer 11, as a result of which the system intervenes to statically support or stabilize the grid.

Also taking the imaginary parts of the positive sequence, negative sequence and, if appropriate, zero sequence system components of the compensation current into account results here in a compensation current that is not restricted to reactive current components that lag the voltage. This not only enables grids with predominantly inductive impedance to be supported, but also such grids that have inductive and resistive impedance components in any ratio. In particular, this also includes grids with predominantly resistive impedance, such as low-voltage grids for example. At the same time, the method is adapted to suit the prevailing impedance ratios, specifically the ratio of inductive to resistive impedance of the grid, by means of the droop functions in acts 103, 403 and, if appropriate, 503.

The parameters of the droop functions, in particular their slopes and their dead bands, are therefore modified in a suitable form depending on the prevailing impedance ratios at the grid connection point. For example, the slopes M of the individual droop functions in the blocks 103, 403 and 503 (compare FIG. 4) can be parameterized as follows as a function of the ratio of the resistive component R to the reactive component X to match the grid impedance, which can be represented in the form PHI=a tan(X/R):

$$M(103a)=-\sin(PHI), M(403b)=\cos(PHI)$$

$$M(403c)=\cos(PHI), M(403d)=\sin(PHI)$$

$$M(403e)=\cos(PHI), M(403f)=-\sin(PHI)$$

From this, it follows that for grids with predominantly inductive impedance, e.g. an MV grid with PHI approximately 90 degrees, M(403b), M(403c) and M(403e) tend to zero. For grids with predominantly resistive impedance, i.e. LV grids with PHI approximately 0 degrees for example, M(103a), M(403d) and M(403f) tend to zero. Appropriate intermediate values ensue for all other basically possible impedance ratios.

In a similar way, the scaling factors for the droop functions of the zero sequence system in the blocks 503c-503f can be defined as follows:

$$M(503c)=\cos(PHI), M(503d)=\sin(PHI)$$

$$M(503e)=\cos(PHI), M(503f)=-\sin(PHI)$$

The prevailing grid characteristics, in particular the grid impedance at the connection point, can be determined or also communicated in various ways. The grid impedance can thus be measured by the inverter itself. Alternatively, an external instance, for example the grid operator, can communicate the prevailing grid impedance to the inverter.

The disclosure is not restricted to the described example embodiments, which can be modified in many ways. In particular, it is possible to implement the stated features in other combinations than those mentioned. It is particularly conceivable and advantageous to implement the method according to the disclosure as follows:

The grid state can also be tracked (observed) by means of a PLL controller in that this receives the measured time courses 300 of the grid voltages as input values and delivers the symmetrical components 301, 302a, 302b as the result.

The reference values 304a, 304b, 304c can be at least partially specified as scalar values, wherein in one embodiment the reference value 304a for the real part of the positive sequence system component of the grid voltage corresponds to the agreed voltage at the grid connection point and/or the reference values 304b, 304c are equal to zero.

The reference values 304a, 304b, 304c can also be formed from the, if necessary, normalized time courses of the symmetrical components 301, 302a, 302b by means of low-pass filters, for example, with time constants that are individually defined for each component.

A fault can be defined in that a deviation of the positive sequence and negative sequence system components from their reference values 304a, 304b, 304c and 401, 402a, 402b, 502a, 502b respectively that lies outside a dead band (defined individually for each component) is detected. Such a fault can be stored as a message in the inverter 22 and/or communicated to a superimposed control unit 20 and/or to the system operator and/or to the grid operator by suitable communications means.

Advantageously, a compensation current can be fed in as soon as at least one of the deviations of the symmetrical components has left the dead band of the associated droop function.

As well as the already mentioned lineardroop functions, which are defined by a factor, the droop functions can also be multi-dimensional, wherein, for example, measured parameters of the supply grid, such as voltages and/or currents as well as, in particular, different grid impedances at the low-voltage or medium-voltage level, are taken directly into account. The droop functions used at 103 and, if necessary, 403, 503 to determine the symmetrical components of the compensation currents can be specified as tables that assign compensation currents, which are to be fed-in, to the deviations of the grid voltages from their reference values in a particularly complete manner. The droop functions can also be parameterized to reduce the memory requirement, wherein it can be further expedient if separate parameters can be provided for the slopes of the droop functions of the positive sequence and the negative sequence system and for the positive and negative dead band of the droop functions in each case. In addition, as a refinement, differentiation can be made as to whether the droop function starts with a specifiable slope at the coordinate origin and is set to zero within the dead band that may be provided, or whether the droop function starts from zero at the boundary of the dead band and from there increases with the specifiable slope.

In order to protect the inverter components, in particular when deviations of the grid state from its reference state occur suddenly and thus cause rapid changes of the compensation currents to be fed in, the "ramping up" of the feeding-in of a compensation current can be carried out with a definable time-related characteristic, in particular a definable maximum slew rate.

According to a further particularly advantageous variant, depending on a specifiable characteristic, the feeding-in of a compensation current can be continued for a specifiable time after the fault has finished and the grid state has returned to the dead band of the droop function. Here, in order to achieve a particularly optimum compensation result, a further droop function, which in particular contains no dead band or contains a dead band that is modified compared with the original droop function, can be defined for this specifiable time.

Further, according to a further variant, it is expedient to limit the resulting amplitude of the feed-in current to a maximum value relating to the power output of an inverter in order to prevent an overloading of inverter components. In doing so, the feed-in currents can be distributed adaptively, namely based on a specifiable prioritization of the limit for the fed-in active power, positive sequence system compensation by feeding in reactive power and asymmetrical negative sequence system compensation (listed with preferably increasing priority).

The chosen representation of the symmetrical components as complex variables with real part and imaginary part for positive sequence and negative sequence system in the diagrams and the description is to be understood as an example. The method can alternatively be implemented in different coordinate systems known to the person skilled in the art, such as dq-coordinates, alpha-beta coordinates and also in the time domain for example.

| Abbreviations, references, method steps and formula symbols | |
| --- | --- |
| Abbreviation | Meaning |
| FRT | "Fault Ride Through" |
| LV | Low-voltage level |
| MV | Medium-voltage level |
| HV | High-voltage level |
| References | Designation |
| 1 | Device for generating and distributing electrical energy |
| 2 | Photovoltaic generator |
| 3, 4, 5, 6 | Photovoltaic module |
| 7, 8 | Positive and negative DC cable respectively |
| 9 | Power stage of an inverter |
| 10 | Low-voltage level for supplying consumers with electrical energy |
| 11, 13 | Transformer |
| 12 | Medium-voltage level of an electrical distribution grid |
| 14 | High-voltage level of an electrical distribution grid |
| 15 | Control unit |
| 16, 17, 18 | Voltage measuring cables |
| 19 | Control signal |
| 20 | Control unit |
| 21 | Control signal |
| 22 | Inverter |
| Method step | Description |
| 100 | Measurement of the time courses of the grid voltages |
| 101 | Transformation of the grid voltage into symmetrical components |
| 102 | Determination of normalized changes of the symmetrical components |
| 102a | Determination of normalized changes of the positive sequence system components |
| 102b | Determination of normalized changes of the negative sequence system components |
| 102c | Determination of normalized changes of the zero sequence system components |
| 103 | Determination of compensation currents in symmetrical components |
| 103a | Determination of the imaginary part of the positive sequence system compensation currents |
| 103b | Determination of the imaginary part of the negative sequence system compensation currents |
| 103c | Determination of the real part of the negative sequence system compensation currents |
| 104 | Incorporation of active current requirements and static reactive current requirements as well as current limitation and prioritization |
| 105 | Output of setpoints for the feed-in currents |
| Formula symbols | Designation |
| 300 | Measured time courses of the grid voltages [volts] |
| 301 | Real part of the positive sequence system components of the grid voltage [volts] |
| 302a | Real part of the negative sequence system components of the grid voltage [volts] |
| 302b | Imaginary part of the negative sequence system component of the grid voltage [volts] |
| 303 | Inverse value of the agreed voltage at the grid connection point [volts$^{-1}$] |
| 304a | Reference value for real part of the positive sequence system components |
| 304b | Reference value for real part of the negative sequence system components |
| 304c | Reference value for imaginary part of the negative sequence system components |
| 305 | Normalized deviation of the real part of the positive sequence system components |
| 306a | Normalized deviation of the real part of the negative sequence system components |
| 306b | Normalized deviation of the imaginary part of the negative sequence system components |
| 307 | Imaginary part of the positive sequence system components of the compensation current [amps] |
| 308a | Imaginary part of the negative sequence system components of the compensation current [amps] |
| 308b | Real part of the negative sequence system components of the compensation current [amps] |
| 309a | Prevailing PV generator current [amps] |
| 309b | Static active current requirement [amps] |
| 310 | Static reactive current requirement [amps] |
| 311 | Static negative sequence system requirement [amps] |
| 312 | Setpoints for the positive sequence system components of the feed-in current [amps] |
| 313 | Setpoints for the negative sequence system components of the feed-in current [amps] |
| 401 | Reference value for real part of the positive sequence system components |
| 402a | Reference value for real part of the negative sequence system components |
| 402b | Reference value for imaginary part of the negative sequence system components |
| 403 | Determination of compensation currents in positive sequence/negative sequence system components |
| 403b | Determination of the real part of the positive sequence system compensation currents |
| 403c | Determination of a first component of the imaginary part of the negative sequence system compensation currents |
| 403d | Determination of a second component of the imaginary part of the negative sequence system compensation currents |
| 403e | Determination of a first component of the real part of the negative sequence system compensation currents |
| 403f | Determination of a second component of the real part of the negative sequence system compensation currents |
| 404a-c | Low-pass filter |
| 407 | Real part of the positive sequence system components of the compensation current [amps] |
| 500a | Real part of the zero sequence system components of the grid voltage [volts] |
| 500b | Imaginary part of the zero sequence system components of the grid voltage [volts] |
| 502a | Reference value for real part of the zero sequence system components |
| 502b | Reference value for imaginary part of the zero sequence system components |
| 503 | Determination of compensation currents in zero sequence system component |
| 503c | Determination of a first component of the imaginary part of the zero sequence system compensation currents |
| 503d | Determination of a second component of the imaginary part of the zero sequence system compensation currents |
| 503e | Determination of a first component of the real part of the zero sequence system compensation currents |
| 503f | Determination of a second component of the real part of the zero sequence system compensation currents |
| 504b-c | Low-pass filter |
| 506a | Normalized deviation of the real part of the zero sequence system components |
| 506b | Normalized deviation of the imaginary part of the zero sequence system components |
| 508a | Imaginary part of the zero sequence system components of the compensation current [amps] |
| 508b | Real part of the zero sequence system components of the compensation current [amps] |
| 514 | Setpoints for the zero sequence system components of the feed-in current [amps] |

The invention claimed is:

1. A method for grid support by means of an inverter, wherein the grid is supported by feeding in compensation currents, comprising:
measuring a prevailing grid state;
breaking down voltages measured for measuring the prevailing grid state into symmetrical components of the grid state including positive sequence system components and negative sequence system components;
determining symmetrical components of a compensation current including positive sequence system components and negative sequence system components of the compensation current as functions of deviations of the positive sequence system components and negative sequence system components of the grid state from reference values; and feeding-in a compensation current as a function of the determined symmetrical components of the compensation current.

2. The method as claimed in claim 1, wherein at least one of the reference values is determined as an average value of the respective symmetrical component of the grid state.

3. The method as claimed in claim 2, wherein at least one of the average values is formed by low-pass filtering.

4. The method as claimed in claim 1, wherein at least one of the reference values is specified as a setpoint that describes an optimum state of the grid state.

5. The method as claimed in claim 4, wherein the setpoint is dependent on a grid impedance.

6. The method as claimed in claim 1, further comprising determining zero sequence system components of the compensation current as functions of the deviations of zero sequence system components of the grid state from reference values.

7. The method as claimed in claim 1, wherein the determination of the symmetrical components of the compensation current is based on real and/or imaginary parts of the positive sequence system and negative sequence system and selectively the zero sequence system of the grid state.

8. The method as claimed in claim 1, wherein functions used for determining the symmetrical components of the compensation current comprise droop functions, for which at least the parameters "slope" and "dead band" are provided.

9. The method as claimed in claim 8, wherein the droop functions are dependent on the grid impedance.

10. The method as claimed in claim 9, wherein the grid impedance is determined by the inverter.

11. The method as claimed in claim 8, further comprising providing separate parameters for a positive dead band and a negative dead band of the droop function.

12. The method as claimed in claim 8, further comprising providing separate parameters for the droop functions for determining the symmetrical components of the compensation current including the positive sequence system components and the negative sequence system components and selectively the zero sequence system components.

13. The method as claimed in claim 8, further comprising feeding in the compensation current after leaving the dead band of at least one of the droop functions.

14. The method as claimed in claim 1, further comprising providing a definable slew rate of the compensation current.

15. The method as claimed in claim 1, wherein the feeding-in of the compensation current is continued depending on a specifiable droop function for a specifiable time after the grid state has returned into a dead band.

16. The method as claimed in claim 1, wherein the feeding-in of the compensation current generates a fault message, which is stored in the inverter or in a superimposed control unit and/or is communicated to a system operator and/or to a grid operator.

17. The method as claimed in claim 1, wherein the compensation current is limited to a maximum value of a current that the inverter is able to supply.

18. The method as claimed in claim 17, wherein the maximum compensation current for the inverter is distributed adaptively based on a prioritization of the limits for fed-in active power, the positive sequence system compensation by feeding in reactive power and an asymmetrical negative sequence system compensation.

19. The method as claimed in claim 1, wherein requirements of a grid operator for static reactive currents and/or static negative sequence system components are taken into account in the method.

20. The method as claimed in claim 1, wherein the grid state is tracked by means of a phase locked loop.

21. The method as claimed in claim 1, wherein determining the symmetrical components of a compensation current comprises determining the positive sequence system component of the compensation current as a function of a deviation of the positive sequence system component of the grid state from a reference value for the positive sequence system component of the grid state, and determining the negative sequence system component of the compensation current as a function of a deviation of the negative sequence system component of the grid state from a reference value for the negative sequence system component of the grid state.

22. An inverter system for providing grid support, comprising:
    a power stage configured to receive an input signal from a power generator and provide an output signal to a grid; and
    a control unit configured to receive the grid voltages and provide control signals to the power stage to modify the output signal to the grid, in order to stabilize the grid;
    wherein the control unit is configured to provide the control signals by measuring a prevailing grid state, breaking down voltages measured for measuring the prevailing grid state into symmetrical components of the grid state including positive sequence system components and negative sequence system components, determining symmetrical components of a compensation current including positive sequence system components and negative sequence system components of the compensation current as functions of deviations of the positive sequence system components and negative sequence system components of the grid state from reference values and feeding-in a compensation current as a function of the determined symmetrical components of the compensation current to the power stage.

* * * * *